Jan. 2, 1934.                L. C. HESTER                1,941,940
                               PLOW
                         Filed May 4, 1932
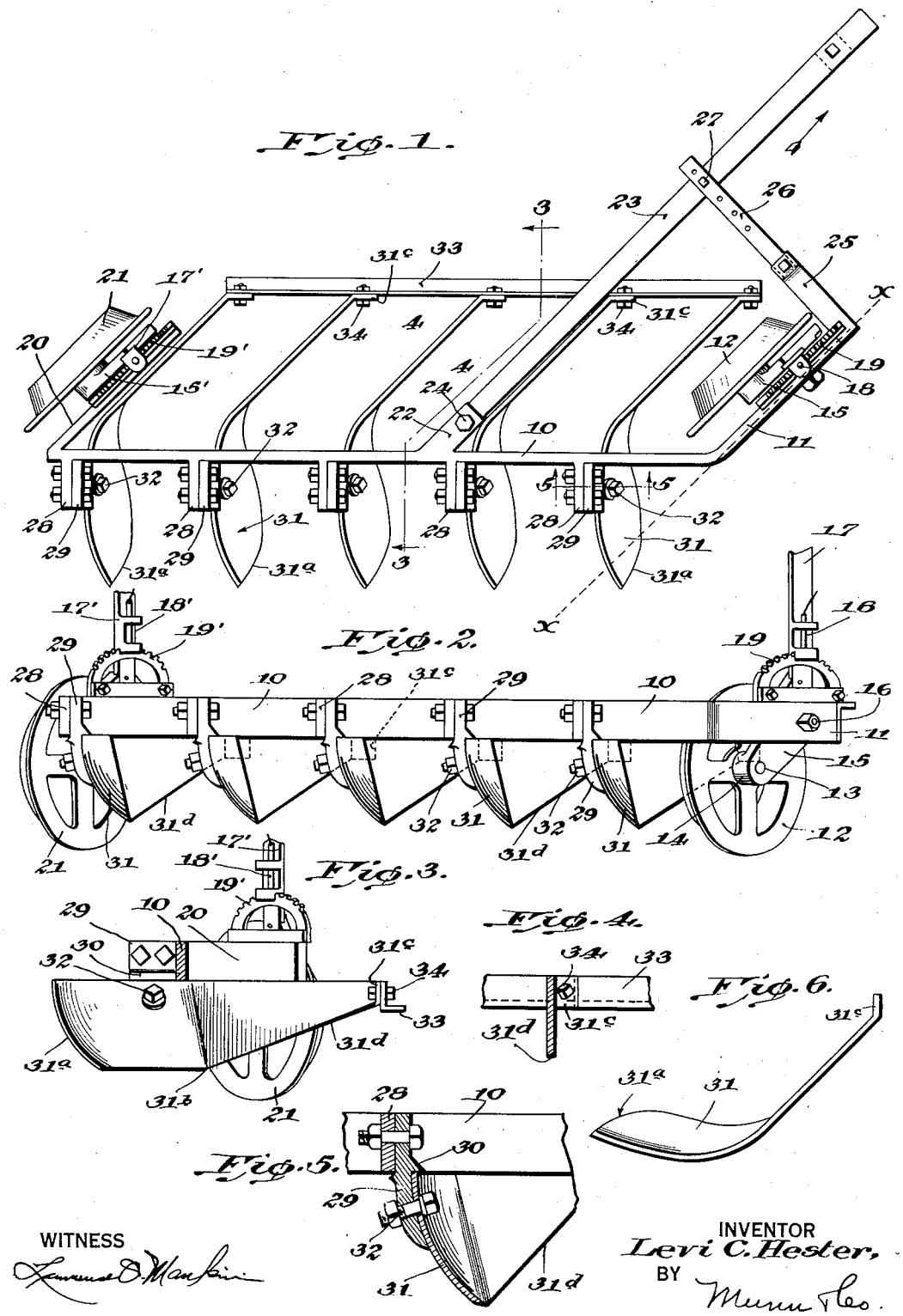

Patented Jan. 2, 1934

1,941,940

UNITED STATES PATENT OFFICE 1,941,940

PLOW

Levi C. Hester, Jacksonville, Fla.

Application May 4, 1932. Serial No. 609,246

3 Claims. (Cl. 97—53)

My invention relates to plows of the disk type, and it consists in the combinations, constructions and arrangements herein described and claimed.

An object of my invention is to provide a plow of the disk type which is capable of plowing at uniform depths as distinguished from the usual disk plow in which the circular blades of the disk necessarily plow at different depths because of the shape and position of the blades.

A further object of the invention is to provide a device of the type described in which disk boxes and bearings found in the usual disk plow are eliminated.

A further object of the invention is to provide a device by means of which land having vegetation thereon may be plowed and the vegetation cut in advance of the plowing without, however, necessitating the additional use of a coulter wheel.

A further object is to provide a plow in which breakage is reduced to a minimum by the provision of means whereby the blade will ride over obstacles.

A further object is to provide a plow having wheels which run on the smooth unplowed land as distinguished from those plows in which the wheels run in the furrows.

A further object is to provide a plow in which the wheels are so located as to plow uniformly on flat, rolling, or terraced land.

Other objects and advantages will appear in the following specification, and the novel features of the invention will be particularly pointed out in the appended claims.

My invention is illustrated in the accompanying drawing which forms a part of this application, in which:—

Figure 1 is a plan view of a plow constructed in accordance with my invention.

Figure 2 is a rear view.

Figure 3 is a section on the line 3—3 of Fig. 1.

Figure 4 is a section on the line 4—4 of Fig. 1.

Figure 5 is a section on the line 5—5 of Fig. 1, and

Figure 6 is a perspective view of a blade curved in the opposite direction from that shown in Fig. 1.

In carrying out my invention I provide a U-shaped frame 10. On the inside of the arm 11 of the U-shaped frame is secured a wheel 12. This wheel, as will be observed from the drawing, is mounted on an axle 13, which is journalled at 14 at the end of a bell crank lever 15, which is pivoted at 16. The upper portion of this lever consists of a handle 17 having a locking member 18 arranged to engage a toothed segment 19 secured to the frame portion 11.

At the opposite end of the frame, the frame portion 20 bears a wheel 21 on the outside thereof, this wheel being mounted in the same manner as that already described in connection with wheel 12, and being movable to an adjusted position by means of the handle 17' which cooperates with a segment 19' and a locking member 18'.

Secured to the frame member 10 is a draw bar 22. A tongue 23 is pivotally connected to the draw bar at 24. A bar 25 is secured at the end of the frame portion 11 and has an adjustable extension 26 provided with openings arranged to receive a bolt 27, or other suitable connecting means on the tongue 23, so that the tongue may be held in adjusted positions with respect to the pivot 24.

As will be seen from Figs. 1 and 5, the frame 10 has rearwardly extending members 28 and to each of these members 28 a plate 29 is bolted. This plate, as will be observed in Fig. 5, is curved, and is provided with an abutment 30 against which the edge of the plow blade 31 engages. A bolt 32 holds the disk or blade firmly to this plate.

The shape of the blade forms one of the novel features of the invention. As will be seen in Fig. 3, it is substantially flat on its top edge and on its bottom edge. The rear end as shown at 31a is curved from the top forwardly to the bottom. At a point 31b the edge is inclined upwardly and at the forward end there is a flange portion 31c. As will be seen from Fig. 5, the blade is curved or dished, being convex on the side next to the supporting plate 29 and concave on the opposite side.

Usually it is desirable to have a number of these blades secured to the frame in the manner already described. The front ends of the blades are all secured together by means of an angle bar 33, bolts 34 passing through the flanged portions 31c.

From the foregoing description of the various parts of the device the operation thereof may be readily understood.

In the use of the ordinary disk plow, the best that can be expected is a series of furrows which are deeper at the center of the furrow, and which gradually decrease in depth toward the edges thereof. The present invention is designed to plow uniformly over all the ground which is spanned by the device. Consider Figure 1. It will be noted that the direction of movement which is indicated by the arrow is such that there is no ground left between adjacent blades, but that all of the ground between the first and last blades is engaged. The blades in being drawn forward, as for instance over land covered with vegetation of the preceding year, cuts the turf, grass and weeds by means of the inclined cutting edge 31d, see Figure 3. This cut portion is then engaged by the curved rear portion and turned over, that is, turned to the right in Fig. 1. Since the blade is drawn steadily forward, the cut, and hence the plowing, will be uniform.

The depth to which the plowing is done may be regulated by the handles 17, 17', which will lift the wheels or lower them, so as to bring the frame farther or closer to the ground. It will be observed that the wheel 12 rides always on the unplowed ground and not in the furrow, as is common with most plows. The dotted line X—X in Fig. 1 represents substantially the line of the furrow made by the right hand blade. The wheel 12, it will be observed, is on the inside, and hence is riding on the unplowed ground. This is a great advantage, since it tends to make for more uniform plowing. The reason is that where a wheel rides in a furrow, it must meet with different resistances. There will be times when the soil will be soft and the wheel will sink, and again times when it will be harder and the wheel will ride over it. Moreover, there are clods that are apt to fall in the furrow which cause the wheel to rise, and therefore cause the plow blades to rise, and thus make a more shallow furrow with the ordinary disk plow. In the present invention these difficulties are largely obviated.

Another feature of advantage is that this device obviates the necessity of coulter wheels, the inclined surface 31d serving to cut the sod as already explained. If one of these inclined surfaces should strike an obstacle such as a rock, it will not break the blade or result in the stopping of the plow, as with the ordinary disk type plow, but will ride over it and will thus reduce the tendency to breakage, and the time taken out for repairs.

It is usually impossible to plow uniformly at a slight depth. Thus, in orchards where it is desirable to plow out a slight depth, it has been necessary to use harrows, but this requires going over the land a great number of times in order to assure the turning over of the soil on the whole surface. With the device as set forth herein, the whole surface can be turned over by going over it once. The wheels may be set so that the blades will enter at a slight depth, say two or three inches, and the entire surface of the ground is turned over by going over it once and at a uniform depth.

Another feature which distinguishes this plow from the usual disk plows is the fact that the blades are rigidly secured in position, and this obviates the expensive boxes and bearings which are usually found in connection with disk plows.

In plowing on terraced land it is usually customary to plow diagonally with respect to the direction in which the terraces extend. Owing to the location of the wheels, these being substantially by the sides of the blade, see Fig. 3, a uniform depth of plowing can be had regardless of crossing different elevations. Thus with those plows which have wheels in the rear of the plow the plow blade will plow deeper when a rise is encountered, when the wheel to the rear of the plow has not yet reached the rise. In the ordinary plow where the wheel is to the rear, when the wheel reaches an elevation this tends to bring the plow point nearer to the surface, and an abnormally shallow furrow is plowed. The wheel in the present invention being substantially at the same place as the blade, reaches the elevation at the same time that the blade does, and consequently the plowing of the field will follow closely the contour of the field at a uniform depth.

It is obvious that instead of throwing the dirt to the right, as shown in Fig. 1, it might be thrown to the left. Thus, in Fig. 6 I have shown a blade curved in the opposite direction from those shown in Fig. 1. Such blade might be used with a blade shaped as in Fig. 1, to throw the dirt in both directions if desired.

I claim:

1. A plow of the disk type comprising a frame, a plurality of blades rigidly secured to the frame, a wheel carried by the frame at each end thereof, one of said wheels being outside of the frame and the other wheel being within the frame and in advance of one of said blades whereby the last named wheel rides on firm ground.

2. A plow comprising a U-shaped frame, rearward extensions carried by said frame, a plate rigidly secured to each extension, and a blade rigidly secured to each plate, said blades overlapping in the direction of movement and each blade having a front land cutting portion, and a rear land turning portion.

3. In a plow construction, a frame, a plurality of blades rigidly secured to the frame, each of said blades comprising a single piece of metal having a flat bottom edge, an outwardly and upwardly curved rear edge, a straight inclined edge extending from the flat bottom edge to the front of the blade, and a straight upper edge extending from the front of the blade to the rear end thereof, said blades being arranged in overlapping relation, the front of each blade constituting a land cutting portion and the rear a land turning portion.

LEVI C. HESTER.